June 21, 1927.

I. A. OLIVER

PUMP BEARING

Filed Oct. 5, 1926

Inventor
Immanuel A. Oliver
By Churcr & Church
his Attorneys

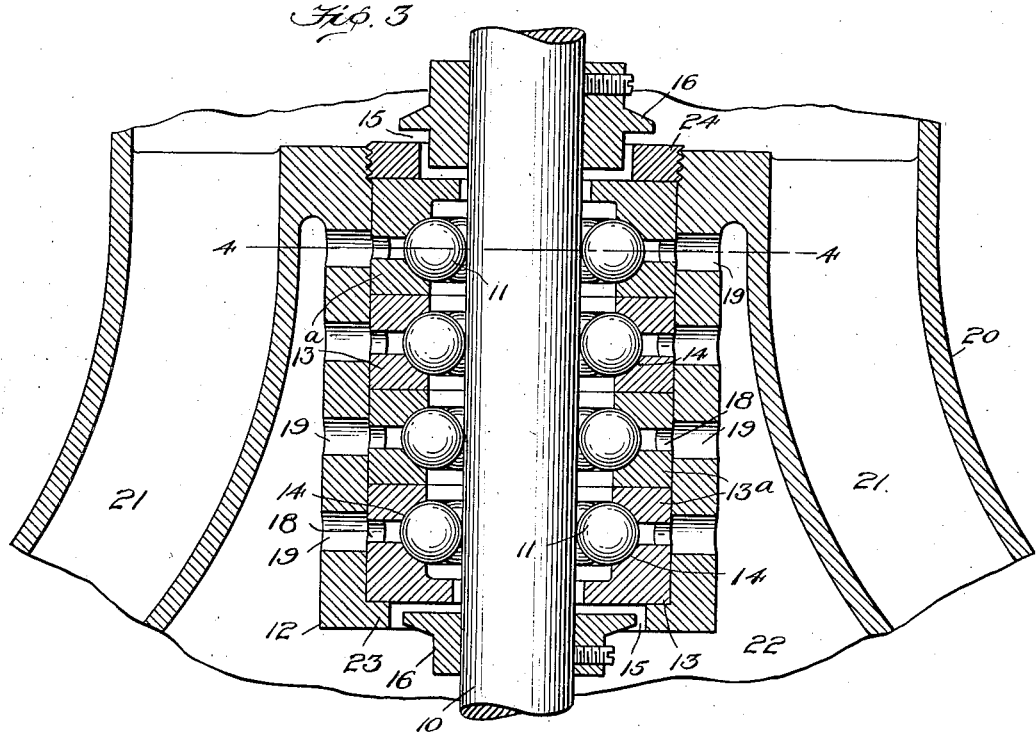
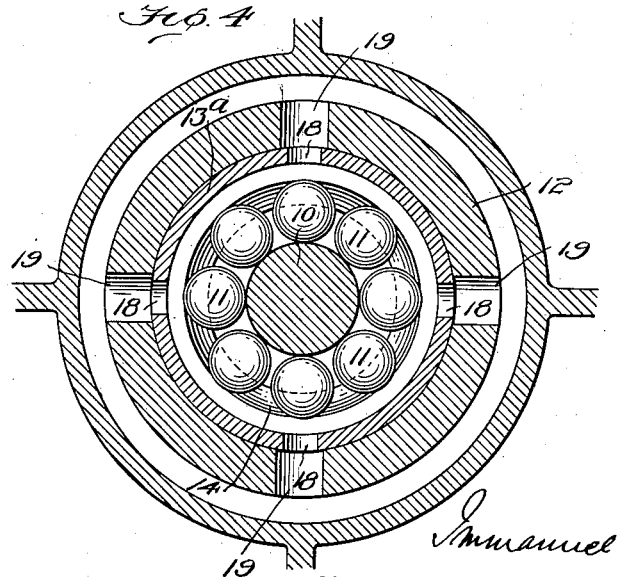

Patented June 21, 1927.

1,633,188

UNITED STATES PATENT OFFICE.

IMMANUEL ALVIN OLIVER, OF POMONA, CALIFORNIA, ASSIGNOR TO THE POMONA MANUFACTURING COMPANY, OF POMONA, CALIFORNIA, A CORPORATION OF CALIFORNIA.

PUMP BEARING.

Application filed October 5, 1926. Serial No. 139,692.

This invention relates to improvements in bearings particularly adapted for use in connection with pumps or like water handling apparatus.

In pumps, and more especially those which are called upon to handle water or other liquid containing sand, grit or other similar substances which have a highly detrimental effect on bearings, considerable attention has been given the problem of preventing wear on the pump bearings, and the many types of sand proof bearings which have heretofore been devised and actually put in use have proven the theory that a bearing consisting of a metal shaft operating on bearing surfaces of resilient material will give far greater service than any other form of bearing under similar conditions. In view of this, the primary object of the present invention is to provide a pump bearing having bearing surfaces of a resilient material, such as rubber, wherein sand or other abrasive materials can not become packed so as to impose any considerable wear on the bearing surfaces or shaft. In this connection, it will be understood that oil or other similar lubricating substances can not be utilized for lubricating the pump bearings operating in water, and that in bearings such as the present the water itself is the lubricating medium. Hence, if sand is being pumped along with the water such sand necessarily enters the bearing along with the water, and it is, therefore, necessary to reduce as much as possible the liability of the sand wearing or scoring the shaft and bearing surfaces.

More particularly, the present invention contemplates a pump bearing which is not only provided with bearing surfaces having a very limited contact with surrounding surfaces, including the shaft, but which is also provided with means for readily effecting a removal from within the bearing of any sand or similar substances which may be carried into the same by the water.

With these and other objects in view, the invention consists in certain novel details of construction and combinations and arrangements of parts, all as will hereinafter be more fully described and the novel features thereof particularly pointed out in the appended claims.

In the accompanying drawings:

Fig. 3 is a longitudinal sectional view illustrating a modification of the present invention; and Fig. 4 is a transverse sectional view of the bearing illustrated in Fig. 3.

Figure 1:
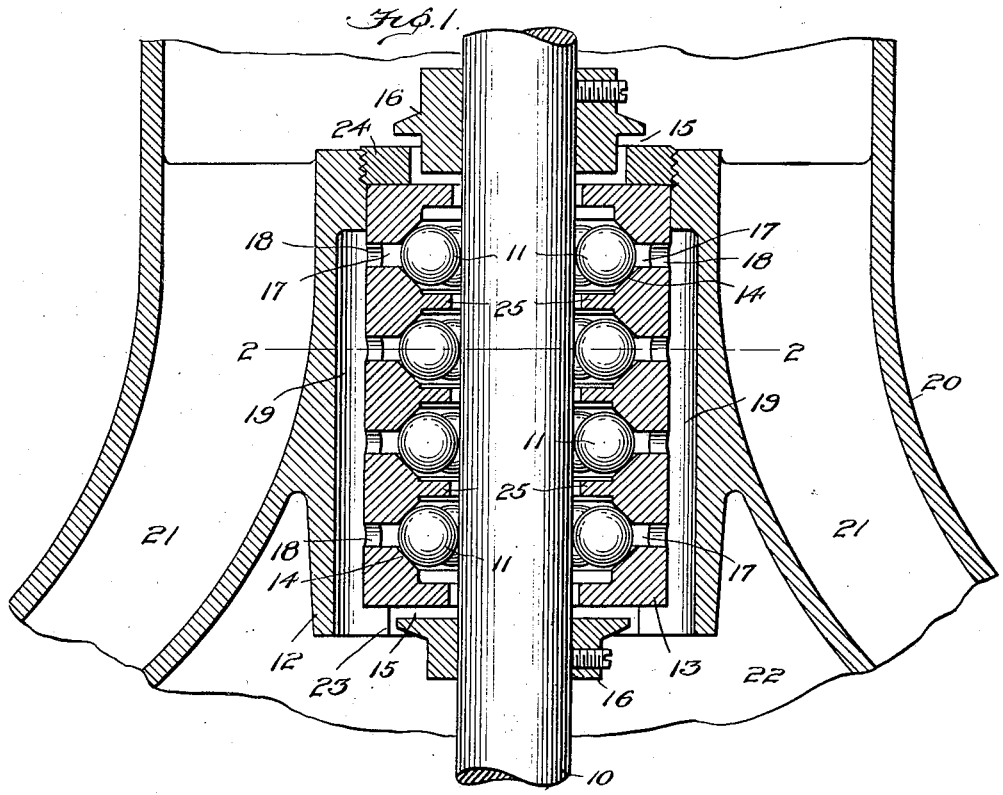
Figure 1 is a longitudinal sectional view of a pump bearing embodying the present improvements.
Figure 2:
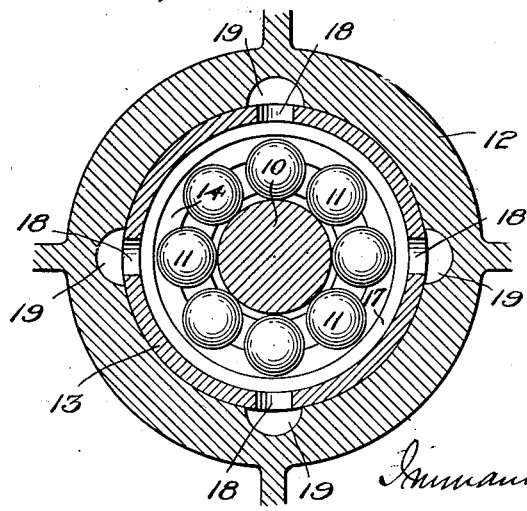
Fig. 2 is a transverse sectional view of the bearing illustrated in Fig. 1.

As previously outlined, it is desirable that the bearing surfaces of the bearing engage the shaft only over a very limited area, the advantage of such an arrangement being that a more restricted area of contact will have a greater tendency to prevent accumulation of sand or other detrimental foreign substances between the cooperating portions of the shaft and bearing surfaces, it being understood that if sand should accumulate on the surface of the shaft, the prevention of scoring or cutting out of the shaft and bearing surfaces is practically an impossibility. For this reason, the pump shaft 10 is adapted to be supported by the bearing in the present instance through the instrumentality of a series of bearing elements in the form of ball bearings 11 of resilient material, preferably vulcanized live rubber. The rubber ball bearings 11 are properly positioned within a cage 12 surrounding the shaft 10, such positioning means consisting of a shell 13 having any desired number of raceways 14 formed therein. As shown in Figures 1 and 2, the raceway shell 13 is made of a single piece of suitable material having the raceways 14 machined therein. For preventing the accumulation of sand or similar substances between the bearings 11 and the raceways 14, said raceways are preferably formed with inclined side faces whereby a point contact will not only be made by the balls with the shaft, but also by the balls with the supporting surfaces of the raceways. With such a construction, sand carried by the water through the bearing will have little if any opportunity to collect or accumulate between the ball bearings 11 and the shaft 10 or between said ball bearings and the supporting surfaces of the raceways 14. It might be added that in practical operation it is necessary for purposes of lubricating the bearing that water should enter the bearing and for this reason passages 15 are provided between the bearing and collar 16 secured to shaft 10 at each end of the bearing. Quite often, and especially when pumping operations are first started, considerable sand is present in the water pumped, and it is this sand which necessarily enters the bearing and requires means for preventing scoring or cutting out of the shaft and the bearing supporting surfaces therefor. However, entry of some of the sand into the bearing is prevented by what are known as sand slingers, indicated at 16ª.

In addition to having point contacts between the ball bearings and the shaft and raceway shell to prevent accumulation of sand in the bearing, means are also provided for effecting what might be termed a discharge of the sand from the bearing. Such discharge means consists in having lines of communication between the bottoms of the raceways 14 and the exterior of the bearing cage 12, these discharge means, in the preferred embodiment of the invention, consisting of a groove 17 in the bottom of each of the raceways, communicating by means of radial ports 18 in the raceway shell with a discharge opening 19 extending longitudinally in the cage 12.

When in operation, the rotation of the shaft and the rotation of the ball bearings in their races sets up centrifugal force by means of which any sand in the interior of the bearing, as well as some of the water, is caused to move into the bottom of the ball races. The sand is whirled around by the velocity of the water and finds its way out through ports 18 and 19 to the exterior of cage 12. As the sand is carried through the bearing, it is kept in motion away from the bearing surface, there being no portions of the bearing where the sand has a chance to wedge in between or slide along between the contacting bearing surface. Although all portions of the pump within the walls 20 may be completely filled with water at all times, the passages 21 show that portion of the pump through which the water is forced or discharged by the pump, while the chambers 22 constitute portions of the pump in which the water is either still or in rotation with the pump itself. It is into this chamber 22 that sand and water are discharged from outlets 19.

In the modification illustrated in Figs. 3 and 4, the ball bearings 11 make point contact only with the shaft 10, the walls of the raceways 14 in this instance being curved to conform to the surface of the walls. The modified form of the invention also differs from that shown in Figure 1 in that the discharge ports 10 in the cage 12 extend radially of the cage and further, the raceway shell 13 is made up of a plurality of sections. Each section is in the form of a ring 13ª, the several rings constituting the raceways being assembled within the cage as will be readily understood. In each form of bearing, the cage 12 has a radially inwardly extending lip 23 at one end and at its other end said cage has a retaining ring 24 screwed into the same to compress either the integral raceway shell or the several sections 13ª of the sectional raceway shell against the shoulder or lip 23. If desired, partitions 25 may be provided between the individual raceways 14, as shown in Figure 1, or they may be omitted as in Figure 3.

No retainers or spacing means for the ball bearings are shown in the present instance, as it is believed that if the balls are fitted with a slight clearance between each other to allow for free rotation and circulation, better results will be obtained, although retaining or spacing means of usual construction may be provided for the balls if desired. The ball races should be constructed of a non-corrosive, non-rustable material, and the balls themselves are preferably constructed of live vulcanized rubber properly cured to give resiliency and wearing qualities. The balls, when wet with the water circulating around them, become very slippery and thoroughly lubricated, and consequently the bearing is substantially frictionless.

I claim:—

1. In a bearing for rotatable pump shafts and the like, a cage for said bearing, a plurality of raceways in said cage, and a series of rubber ball bearings in each of said raceways contacting with said shaft, each raceway having an outlet adjacent the bottom thereof through which gritty substances and other foreign matter will be eliminated from said raceways and cage.

2. In a bearing for rotatable pump shafts and the like, a cage for said bearing, a plurality of raceways in said cage, and a series of rubber ball bearings in each of said raceways contacting with said shaft, each raceway having an annular groove in the bottom thereof through which gritty substances and other foreign matter will be eliminated from the interior of the bearing.

3. In a bearing for rotatable pump shafts and the like, a cage for said bearing, a plurality of raceways in said cage, and a series of rubber ball bearings in each of said raceways contacting with said shaft, said balls making a point contact with the surfaces of said raceways and each of said raceways having a groove therein communicating with the exterior of the cage, whereby gritty matter will be eliminated from the interior of the casing.

4. In a bearing for rotating shafts of pumps and the like, a cage having a multiplicity of raceways in its interior, a series of live vulcanized rubber balls in each raceway and means for circulating a liquid through said bearings, said liquid passing from the interior of the bearing through said raceways to the exterior of the cage.

5. In a bearing for rotatable shafts of pumps and the like, a cage, a series of raceways within the cage, and a multiplicity of rubber ball bearing elements in each raceway contacting with said shaft, each raceway having a continuous groove in the bottom thereof communicating with a discharge duct in said cage whereby gritty substances in the interior of the bearing may be conveyed to the exterior of the cage.

6. In a bearing for rotatable shafts of pumps and the like, a cage, a shell within said cage having a series of raceways therein, and a plurality of rubber ball bearings in each raceway, there being a discharge passage in said cage and each of said raceways having a groove in the bottom thereof communicating with the discharge passage in the cage by means of ports in said raceway shell.

IMMANUEL ALVIN OLIVER.